J. F. TRUMAN.
ADJUSTABLE CAKE PAN.
APPLICATION FILED FEB. 13, 1911.
993,914.
Patented May 30, 1911.
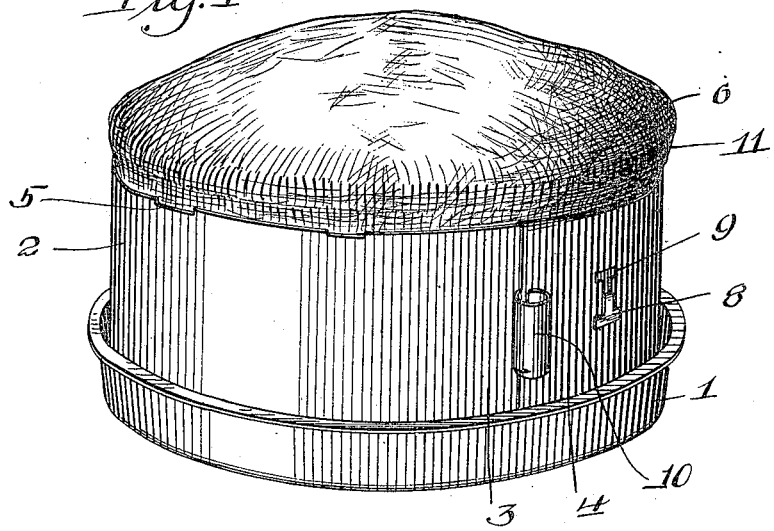
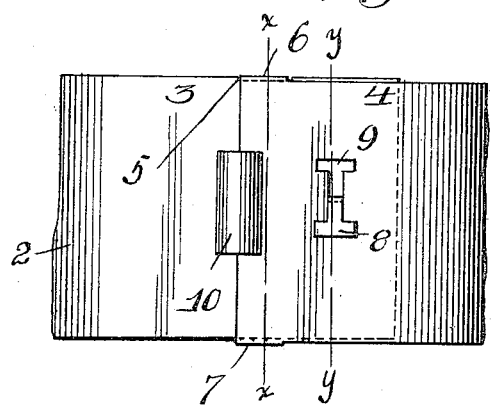
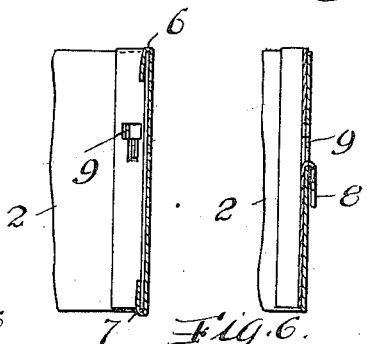
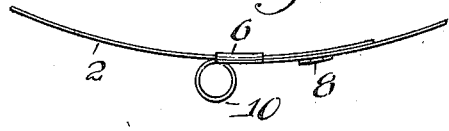
WITNESSES
INVENTOR
J. F. Truman.
by Attorneys.

UNITED STATES PATENT OFFICE.

JOSEPH F. TRUMAN, OF BUTLER, PENNSYLVANIA.

ADJUSTABLE CAKE-PAN.

993,914. Specification of Letters Patent. Patented May 30, 1911.

Application filed February 13, 1911. Serial No. 608,226.

*To all whom it may concern:*

Be it known that I, JOSEPH F. TRUMAN, a citizen of the United States of America, residing at Butler, in the county of Butler and State of Pennsylvania, have invented certain new and useful Improvements in Adjustable Cake-Pans, of which the following is a specification, reference being had therein to the accompanying drawing.

This invention relates to an adjustable baking pan and has for its object to provide a baking pan in a manner as hereinafter set forth whereby the diameter of the body-portion thereof can be increased or diminished when it is desired to enable the article to be baked to be of a diameter desired.

A further object of the invention is to provide a baking pan with an adjustable body-portion whereby the diameter thereof can be increased or diminished when occasion so requires and to further provide the body-portion with means in a manner as hereinafter set forth for locking the ends of the body-portion together after the latter has been adjusted to the desired diameter.

Further objects of the invention are to provide an adjustable baking pan which is comparatively simple in its construction and arrangement, strong, durable, efficient in its use, conveniently adjusted to increase or reduce the diameter of the body-portion of the pan when occasion so requires, and inexpensive to manufacture.

With the foregoing and other objects in view, the invention consists of the novel construction, combination and arrangement of parts as hereinafter more specifically described and illustrated in the accompanying drawings, wherein is shown the prefered embodiment of the invention, but it is to be understood that changes, variations and modifications can be resorted to which come within the scope of the claims hereunto appended.

In describing the invention in detail, reference is had to the accompanying drawings wherein like reference characters denote corresponding parts throughout the several views and in which:

Figure 1 is a perspective view of a baking pan in accordance with this invention. Fig. 2 is a side elevation broken away of the body-portion. Fig. 3 is a top plan of the body-portion broken away. Fig. 4 is a section on line X—X, Fig. 2. Fig 5 is a section on line Y—Y, Fig 2, and, Fig. 6 is a plan of one end of the body-portion broken away.

Referring to the drawing in detail, the baking pan includes a flanged bottom 1 for supporting the body-portion 2 which consists of an elongated strip of relatively wide metallic material adapted to have its ends adjustably-connected together, thereby providing a cylindrical body-portion.

One end portion of the strip from which the body is formed is indicated by the reference character 3 and the other end portion by the reference character 4. The top edge of the end portion 3 is cut-away to provide a series of spaced notches 5 in any one of which is adapted to engage a bendable lug 6 which projects from the top edge of the end portion 4 of the strip at the outer terminus of said end portion 4. The tongue 6 is bent to engage in a notch 5 and to extend against the inner face of the end portion 3 as shown in Figs. 2 and 4 whereby the end portions 3 and 4 are connected together to provide a cylindrical body-portion as clearly shown in Fig. 1. The end portion 4 has projecting from its lower edge at its outer terminus a bendable tongue 7 which is adapted to be bent around the lower edge of the end portion 3 as clearly shown in Figs. 2 and 4 whereby vertical movement of the end portion 4 with respect to the end portion 3 will be prevented.

The end portion 3 is provided with a T-shaped tongue 8 and the end portion 4 with a series of T-shaped openings 9. The tongue 8 is adapted to be bent through one of the openings 9 and against the outer face of the end portion 4 as clearly shown in Figs. 2 and 5 whereby the end portions 3 and 4 are adjustably connected together. The end portion 4 at its outer terminus is provided with a handle 10.

After the body-portion 2 has been adjusted to the desired diameter, it is placed within the flanged bottom 1 and the pan is then in position to receive the dough 11 to be baked.

What I claim is:

A baking pan comprising a bottom, a body-portion capable of being adjusted to varying diameters and formed from a strip of material, said strip provided with notches, tongues carried by one end of the strip and bendable over the edges at the other end of the strip, one of said tongues engaging in one of said notches for maintaining the body-portion at the diameter to which it has been adjusted, the other of said tongues preventing vertical movement of one end of the strip with respect to the other, a tongue carried by one end of said strip and extending through the other end of the strip and bent to engage the outer face of the last-mentioned end of the strip whereby the ends of the strips are connected together, and a handle connected to that end of the strip through which said tongue extends.

In testimony whereof I affix my signature in the presence of two witnesses.

JOSEPH F. TRUMAN.

Witnesses:
   MAX H. SROLOVITZ,
   CHRISTINA T. HOOD.

Copies of this patent may be obtained for five cents each, by addressing the "Commissioner of Patents, Washington, D. C."